United States Patent Office 3,019,229
Patented Jan. 30, 1962

3,019,229
BASIC-5-[1'-METHYL-PIPERIDYL-(4')] - PENTYL - (2) ESTERS, SALTS THEREOF, AND PREPARATION
Anthony Mesnard Parsons, Welwyn Garden City, Herts, England, assignor to Hoffmann-La Roche Inc., Nutley, N.J., a corporation of New Jersey
No Drawing. Filed June 22, 1959, Ser. No. 821,667
Claims priority, application Great Britain July 23, 1958
6 Claims. (Cl. 260—294.3)

This invention relates to novel chemical compounds and to novel processes of making the same. More particularly, the novel chemical compounds referred to are selected from the group consisting of certain basic esters and salts thereof with pharmaceutically acceptable acids and pharmaceutically acceptable quaternizing agents.

The novel basic esters of the invention can be represented by the following general formula

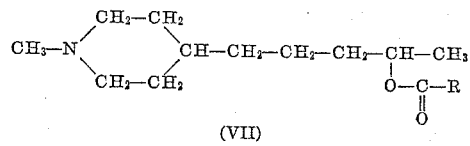

(VII)

In the foregoing formula, the symbol R represents a homocyclic aromatic radical; preferably a radical containing not more than ten carbon atoms selected from the group consisting of homocyclic aryl hydrocarbon radicals and negatively substituted homocyclic aryl hydrocarbon radicals. Thus, the symbol R represents such homocyclic aryl hydrocarbon radicals as phenyl, $\alpha$-naphthyl and $\beta$-naphthyl, and the negative substituents referred to include such substituents as lower alkyl (e.g. methyl, ethyl, etc.), lower alkoxy (e.g. methoxy, ethoxy, etc.), nitro, amino, halo (e.g. chloro, bromo, etc.) and the like. It will be appreciated from the foregoing discussion that the basic esters of the invention comprise esters of 5-[1'-methyl-piperidyl-(4')]-pentanol-(2) with homocyclic aromatic acids containing not more than ten carbon atoms exclusive of the carbonyl group, such as benzoic acid, p-toluic acid, o-toluic acid, p-nitrobenzoic acid, p-aminobenzoic acid, $\alpha$-naphthoic acid, p-methoxybenzoic acid, 3:4:5-trimethoxybenzoic acid, and the like.

The invention further includes addition salts of the foregoing basic esters with pharmaceutically acceptable acids and pharmaceutically acceptable quaternizing agents. Especially preferred acids include such well known pharmaceutically acceptable non-toxic acids as hydrochloric acid, hydrobromic acid, hydriodic acid, sulfuric acid, nitric acid, phosphoric acid, perchloric acid, acetic acid, citric acid, tartaric acid, ethanesulfonic acid, and the like. Especially preferred quaternizing agents include such well known pharmaceutically acceptable non-toxic quaternizing agents as methyl bromide, methyl iodide, methyl sulfate, ethyl chloride, ethyl bromide, ethyl iodide, benzyl bromide, dimethyl sulfate and the like.

It will be appreciated from the foregoing that the salts of the invention can be represented by the general formula

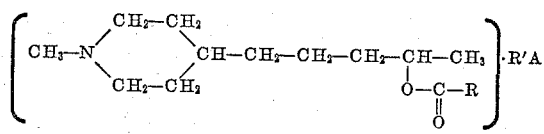

wherein R has the same meaning indicated above, R' represents a member selected from the group consisting of hydrogen, lower alkyl and benzyl, and A represents an anion of a pharmaceutically acceptable acid.

The invention also includes novel processes of making the compounds represented by the above general Formulas VII and VIII. Basic esters of general Formula VII can be made by reacting 5-[1'-methyl-piperidyl-(4')] pentanol-(2) with an aromatic acid halide represented by the general formula (VI)
$$R-\overset{O}{\underset{\|}{C}}-X$$

wherein the symbol R has the same meaning indicated above, and the symbol X represents a halogen, preferably a middle halogen, i.e. chlorine or bromine; and treating the resulting ester hydrohalide with sufficient base to take up the hydrohalic acid and set free the ester. The esterification reaction is preferably effected in solution in an inert organic solvent, e.g. dioxane. Salts of general Formula VIII above can be made by treating a basic ester VII with a compound R'A, wherein the symbols R' and A have the same meaning defined above. In the case of acid addition salts, it is often convenient to effect this reaction by means of an ion exchanger.

A diagrammatic survey of methods of preparing compounds according to the invention is afforded by means of the following comprehensive Flowsheet, wherein the symbols R, R', X and A have the same meaning indicated above:

FLOWSHEET

Stage A

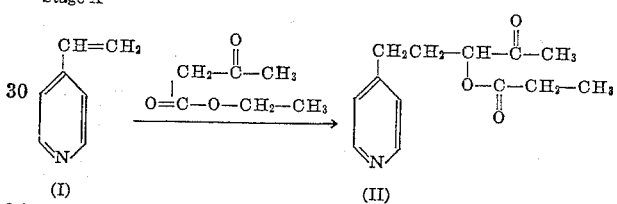

Stage B

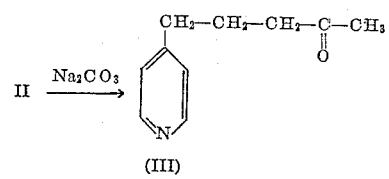

Stage C

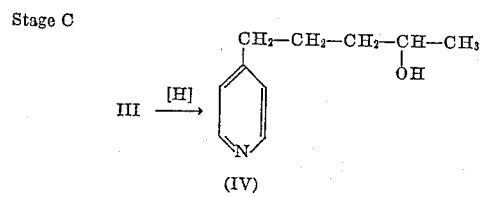

Stage D

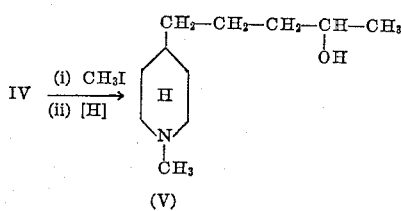

Stage E

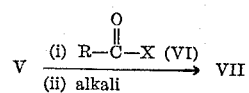

Stage F

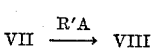

With reference to the Flowsheet, the 5-[1'-methyl-piperidyl-(4')]-pentanol-(2) (Formula V) used as an initial material can be prepared from 4-vinyl-pyridine (Formula I) by condensing same with ethyl acetoacetate, submitting the condensation product to a ketonic hydrolysis, reducing the thus obtained 5-[pyridyl-(4')]-pentanone-(2) (Formula III) by means of an alkali metal aluminum hydride or an alkali metal borohydride or by catalytic hydrogenation, converting the resulting 5-[pyridyl-(4')]-pentanol-(2) (Formula IV) into its methiodide, and reducing said methiodide by catalytic hydrogenation in the presence of Raney nickel.

The basic esters of general Formula VII and their addition salts with pharmaceutically acceptable non-toxic acids exhibit activity as coronary dilators, and are useful in the treatment of coronary insufficiency, e.g. as in angina pectoris, and of peripheral circulatory disturbances and hypertonia.

The invention is further disclosed in the following examples, which are illustrative but not limitative thereof.

EXAMPLES

*(1) The preparation of 5-[1'-methyl-piperidyl-(4')]-pentanol-(2)*

(A) *Ethyl 2 - acetyl - 4 - [pyridyl - (4')] - butyrate.*— 4-vinyl-pyridine (458 g.) was added to a solution of sodium (10.0 g.) in hot ethyl acetoacetate (1.11 liters). The temperature rose and reaction was completed by heating under reflux for five hours. When cool the mixture was poured on to ice and hydrochloric acid (11 N; 500 ml.). After extracting the diethyl ether (3×250 ml.) the aqueous layer was basified with potassium carbonate (500 g.) and re-extracted with ether (3×500 ml.). The extracts were dried over sodium sulfate, evaporated and distilled under nitrogen until a still-head temperature of 100° C./12 mm. was reached. The distillate consisted of water and 4-ethyl-pyridine ($n^{20}$1.5010; $d^{20}$=0.9417; picrate M.P. 168° C.) and was oxidized to isonicotinic acid (M.P. 317° C. d.) by nitric acid.

The pot residue was fish distilled under oil pump vacuum from a 500 ml. flask maintained at 190°–200° C. Ethyl 2-acetyl-4-[pyridyl-(4')]-butyrate (633 g.) was obtained as a yellow oil (B.P.=150° C./0.3 mm.; $n^{20}$1.4990; $d^{20}$=1.08). It gave an amber ferric chloride color reaction and exhibited green fluorescence in ultraviolet light. The picrate crystallized from methanol/ether/(light petroleum of B.P.=40°–60° C.) in yellow needles, M.P.=83° C.

(B) *5-[pyridyl-(4')]-pentanone-(2).*—Ethyl 2-acetyl-4-[pyridyl-(4')]-butyrate (300 g.) was added dropwise with stirring to a boiling solution of anhydrous sodium carbonate (30 g.) in water (3 liters) and the mixture heated under reflux. The mixture cleared after about one hour and the heating under reflux was continued for a further four hours. After adding sodium chloride (500 g.) the aqueous layer was separated and extracted with ethyl acetate (3×25 ml.). The organic layer was repeatedly shaken with small portions of anhydrous potassium carbonate until no more water was salted out. The combined product and ethyl acetate extracts were dried over sodium sulfate, evaporated and distilled under reduced pressure of nitrogen to give 5-[pyridyl-(4')]-pentanone-(2) (198 g.; B.P. 160° C./12 mm.; $n^{20}$1.5103; $d^{20}$=1.02) as a colorless oil exhibiting green fluorescence in ultraviolet light.

(C) *5-[pyridyl-(4')]-pentanol-(2).*—(a) *By lithium aluminum hydride reduction:* 5-[pyridyl-(4')]-pentanone-(2) (213 g.) in diethyl ether (500 ml.) was added to lithium aluminum hydride (50 g.) in diethyl ether (2 liters), the mixture being stirred under a reflux condenser by means of a geared motor. The addition took three hours and heating under reflux was continued for a further two hours. After cooling the complex was decomposed by successive addition of ethyl acetate (50 ml.), water (50 ml.), potassium hydroxide (5 N; 50 ml.) and water (200 ml.). After filtering, the solution was dried over sodium sulfate, evaporated and distilled under reduced pressure of nitrogen to give 5-[pyridyl-(4')]-pentanol-(2) (208 g. $n^{20}$1.5175; $d^{20}$=1.01; B.P.=109°–119° C./0.05–0.07 mm.).

(b) *By hydrogenation:* 5-[pyridyl-(4')]-pentanone-(2) (163 g.) in ethanol (500 ml.) was hydrogenated in the presence of freshly prepared Raney nickel (W7; 15 ml.) and potassium hydroxide (5 N; 5 ml.). One mol was taken up in two hours at 100° C. and 100 atm. After neutralizing with acetic acid (1.5 ml.) and filtering, the solution was evaporated to give 5-[pyridyl-(4')]-pentanol-(2) (165 g.), identical with the product obtained by lithium aluminum hydride reduction and the following potassium boron hydride reduction methods. The hydrobromide crystallized from ethanol/(diethyl ether) in leaflets ; M.P. 122° C.

(c) *By potassium boron hydride reduction:* A solution of 5-[pyridyl-(4')]-pentanone-(2) (106 g.) in methanol (500 ml.) was stirred during the portionwise addition of potassium boron hydride (17.6 g.), the temperature being kept at 25°–30° C. by external cooling. Water (50 ml.) was added and the solution was stirred two hours/20° C. The methanol was removed by evaporation under reduced pressure and the residue was distributed between water (250 ml.) and benzene (250 ml.). The aqueous layer was separated and re-extracted with benzene (2×250 ml.). The extracts were dried (sodium sulfate) and evaporated and the residue distilled under reduced pressure of nitrogen to give 5-[pyridyl-(4')]-pentanol-(2) (102 g. $n^{20}$1.5163; $d^{20}$=1.01; B.P.=117°–122° C./0.20 mm.).

(D) *5-[1' - methyl - piperidyl - (4')] - pentanol - (2).*—Methyl iodide (24 ml.) was added to 5-[pyridyl-(4')]-pentanol-(2) (57.8 g.) in ethanol (116 ml.) and quaternization completed by heating under reflux for 0.5 hour. The cooled mixture was then poured into a separating funnel and shaken with ether (500 ml.). The liquid methiodide was separate, dissolved in ethanol (500 ml.) and placed in a stainless steel autoclave together with Raney nickel (W7; 10 ml.) and diethyl amine (100 ml.) and hydrogenated at 100° C. and 100 atm. until three mols had been absorbed (ca. five hours). After removing the catalyst and solvent the residue was distributed between sodium hydroxide (2 N; 200 ml.) and ether. The aqueous layer was separated and exhaustively extracted with ether. The combined organic layers were repeatedly shaken with small portions of anhydrous potassium carbonate until no more water was salted out, dried over sodium sulfate, evaporated and distilled to give 5-[1'-methyl-piperidyl-(4')]-pentanol-(2) (60.9 g.; $n^{20}$1.4748; $d^{20}$=0.93; B.P.=145°–150° C./12 mm.). The hydrobromide crystallized from ethanol/(diethyl ether) in hygroscopic leaflets; M.P.=111° C.

*(2) The manufacture of esters of 5-[1'-methyl-piperidyl-(4')]-pentanol-(2)*

(i) *5 - [1' - methyl - piperidyl - (4')] - pentyl - (2) benzoate.*—Benzoyl chloride (3.2 ml.) was added to 5-[1'-methyl-piperidyl-(4')]-pentanol-(2) (4.7 g.) in dry dioxane (25 ml.). Crystals began to separate immediately and the mixture became solid within a few minutes. After heating under reflux for 0.5 hour, potassium carbonate (40%, 25 ml.) was added to the cooled solution, the organic layer separated, evaporated and the residue was converted to the hydrobromide (6.6 g.) which crystallized from a mixture of ethanol and ethyl acetate in prisms; M.P. 188°–189° C. The corresponding methiodide crystallized from isopropanol/ether in almost colorless plates; M.P. 117°–119° C.

(ii) *5 - [1' - methyl - piperidyl - (4')] - pentyl - (2) p-nitro-benzoate.*—This compound, M.P. 53° C., was prepared in a manner analogous to that described in (i) above and formed a hydrobromide which crystallized from isopropanol in needles; M.P. 140°–142° C.

(iii) *5 - [1' - methyl - piperidyl - (4')] - pentyl - (2) α-naphthoate.*—This compound was prepared in a manner analogous to that described in (i) above. Its perchlorate crystallized from (ethyl acetate)/ether in prisms; M.P. 92°–94° C.

(iv) *5 - [1' - methyl - piperidyl - (4')] - pentyl - (2)*

*3:4:5-trimethoxy-benzoate.*—This compound was prepared in a manner analogous to that described in (i) above. Its hydrobromide crystallized from isopropanol in leaflets; M.P. 163°–164° C.

(v) *5 - [1' - methyl - piperidyl - (4')] - pentyl - (2) p-aminobenzoate.*—The compound of (ii) above was hydrogated in ethanol over 10% palladium charcoal to give 5-[1'-methyl - piperidyl - (4')] - pentyl-(2) p-amino-benzoate, the dihydrobromide of which crystallized from a mixture of ethanol and ethyl acetate in prisms; M.P. 120°–125° C.

I claim:

1. A compound selected from the group consisting of an ester of the formula

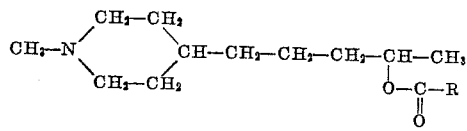

wherein R represents a radical selected from the group consisting of unsubstituted homocyclic aryl hydrocarbon radicals and nuclearly substituted homocyclic aryl hydrocarbon radicals wherein the substituent is selected from the group consisting of lower alkyl, lower alkoxy, nitro, amino and halo; and a salt of said ester with a compound of the formula R'A, wherein R' represents a member selected from the group consisting of hydrogen, lower alkyl and benzyl, and A represents an anion of a pharmaceutically acceptable acid.

2. 5-[1'-methyl-piperidyl-(4')]-pentyl-(2) benzoate.
3. 5-[1'-methyl-piperidyl-(4')]-pentyl-(2) p-nitrobenzoate.
4. 5-[1'-methyl-piperidyl-(4')]-pentyl-(2) α-naphthoate.
5. 5-[1'-methyl-piperidyl-(4')]-pentyl-(2) 3:4:5-trimethoxybenzoate.
6. 5-[1'-methyl-piperidyl-(4')]-pentyl-(2) p-aminobenzoate.

References Cited in the file of this patent
UNITED STATES PATENTS
2,650,230   Cusic _____ Aug. 25, 1953